Nov. 23, 1937.    W. P. TABER    2,099,831
CONNECTER FOR V-BELTS
Filed Feb. 11, 1936
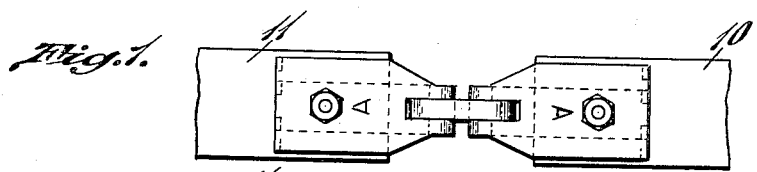
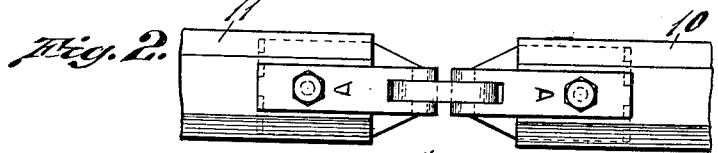
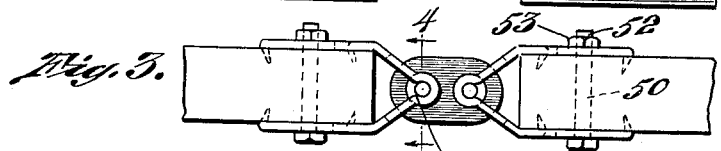
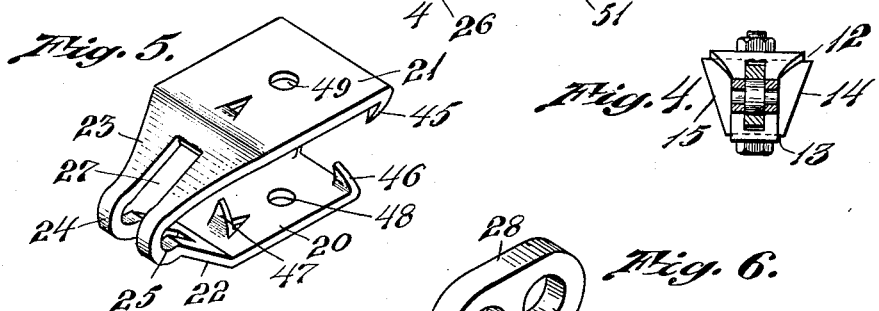
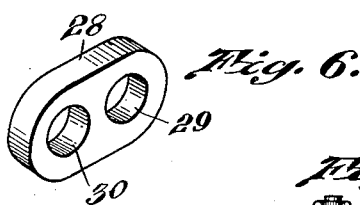
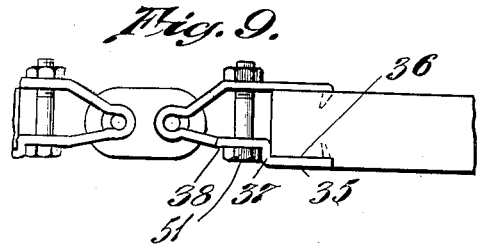
INVENTOR.
Wellington P. Taber
BY Barlow & Barlow
ATTORNEYS.

Patented Nov. 23, 1937

2,099,831

UNITED STATES PATENT OFFICE 2,099,831

CONNECTER FOR V-BELTS

Wellington P. Taber, West Warwick, R. I.

Application February 11, 1936, Serial No. 63,358

6 Claims. (Cl. 24—33)

This invention relates to a connecter for a belt more particularly that type of belt commonly known as a V-belt, although the shape of a cross-section of this belt is in inverted frustro pyramid; and the invention has for one of its objects the provision of a connecter which will prevent the belt from twisting about an axis lengthwise thereof and yet will flexibly connect the ends of the belt together.

Another object of the invention is the provision of a construction which will tightly grip the ends of the belt and yet will not weaken the cords which are within the outer surface of the V-belt and extend lengthwise thereof.

Another object of the invention is the provision of a connecter having parts which may be placed upon the ends of the belt and hinge pin means so placed as to connect the parts together and yet prevented by the tension on the belt from being moved from its desired position.

Another object of the invention is the provision of a connecter, the parts of which will depend upon a mechanical hinging or pivoting action rather than upon flexibility or resiliency of any of the parts.

Another object of the invention is the provision of a belt connecter which will be simple and may be easily assembled on the ends of the belt.

With these and other objects in view, the invention consists of certain novel features of construction, as will be more fully described, and particularly pointed out in the appended claims.

In the accompanying drawing:

Fig. 1 is a top plan view of the end portion of the belt connected together by my belt connecter;

Fig. 2 is a bottom plan view of the same;

Fig. 3 is a side elevation of the same structure shown in Figs. 1 and 2;

Fig. 4 is a sectional view on the line 4—4 of Fig. 3;

Fig. 5 is a perspective view of one of the belt end clamps;

Fig. 6 is a perspective view of the connecting link;

Fig. 7 is a perspective view of the hinge or pintle pin;

Fig. 8 is a sectional view of a pulley with the belt in engagement therewith and showing the relative position of the connecter on the belt;

Fig. 9 is a side elevation in modified form of an end clamp.

In the use of so-called V-belts, connecters for the ends of these belts are at the present time commercially unsatisfactory to such an extent that manufacturers of V-belts make the belts of certain standard sizes of endless or band type; and if one of these standard sizes is not useable on some particular installation, the expense of making up a special size which is between standard sizes is so great as to be practically prohibitive and the V-belt drive is not, therefore, used on such installation. Further, stretching of V-belts sometimes occurs which requires that the same be discarded after a certain length of time as from a practical standpoint shortening cannot take place because there is no satisfactory connecter; and in order to avoid these difficulties, I have provided a belt connecter to overcome these objections and one in which shortening of the belt may be had; and the following is a more detailed description of the present embodiment of this invention, illustrating the preferred means by which these advantageous means may be accomplished:

With reference to the drawing, 10 designates one end portion of a belt and 11 the other end portion of a belt. A belt which is particularly adapted for use of this connecter is of an inverted frustro pyramidal cross-section, as shown in Fig. 4, having a very large or broad outer surface 12, a narrower inner portion or surface 13 and tapering side walls 14 and 15. These side walls 14 and 15 provide frictional engagement with a generally V-shaped groove 16 provided in a pulley 17, shown more fully in Fig. 8. The depth of this groove 16 is sufficient so that the belt does not bottom but obtains its entire frictional driving connection with the tapering side wall 18 of the groove.

Substantially identical clamps may be utilized for engagement with the end portion 11 of the belt, one of which clamps is shown more fully in Fig. 5, the same consisting of a piece of sheet stock cut out in the shape desired and folded to provide the required formation. This consists of a bottom plate 20 and a wider top plate 21 which are joined together by converging portions 22 and 23 at the junction 24 of which a pivot pin bearing 25 is formed which is constricted slightly at the entrance 26 thereto. This portion 23 tapers as well as converges, whereas the portion 22 is of substantially the same width as the bottom plate 20, as is also the junction or folded portion 24. Each clamp is provided with spurs 45 at the corners of the plate 21 and similar spurs 46 at the corners of the lower plate 20, while additional spurs are provided at 47 cut and bent from the stock of the plates inwardly from its periphery thereof. These spurs are of a length to penetrate through the outer skin of the belt but insufficient to extend through the cords and rupture them when the plates are bound in position.

Each plate is also provided with an opening as 48 in plate 20 and 49 in plate 21 through which openings a clamping bolt 50 extends having a head 51 and a thread end 52 for the reception of a nut 53 for forcing the plates toward each other and the spurs into the belt.

A slot 27 is provided in the folded bearing portion which extends into the converging portions 22 and 23 for the reception of a connecting link 28 having openings 29 and 30 for the reception of a connecting pin 31 which is reduced as at 32 at its opposite ends providing a shoulder 33 between the full central size and the reduced end portion thereof.

This portion 32 of the pin is of a size to closely fit although permit pivotal action in one of the openings 29 or 30 while the reduced size of the pin 32 is of a dimension to closely fit within the bearing portion 25 of the folded end of the clamp at the end of the belt connecter. Accordingly, in the assembling, connecting link 28 is placed in the slot 27 in the clamp and the pin positioned in an opening 29, while the link is pushed inwardly sufficiently to permit free access of the pin to this opening, then by pulling on the connecter 28, the reduced portions 32 of the pin may be snapped into the bearing 25 by slight pressure to force them through the restricted portion 26 of the entrance thereto and thus retain the pin in position. A shoulder 33 will engage the edges of the slot 27 to prevent the pin from moving axially in either direction from position.

In some cases, in the use of V-belts, such for instance as where the large pulley is substantially three times the size of the smaller pulley, it is only necessary to have the V-groove for receiving the belt on the small pulley, as there is provided on a smooth, ungrooved large pulley sufficient frictional surface for holding the belt against slipping. Accordingly, a saving may be provided in such a drive by running the belt upon a large ungrooved smooth pulley, although using a V-formed small pulley; and to accomplish such result some different structure is provided to accommodate the bolt in the clamp as the bolt used above would prevent such running on a smooth pulley, I have shown in Fig. 9 such modification.

In the showing of Fig. 9 the lower plate, designated 35, is set into a recess 36 in the lower edge of the belt and is offset as at 37 to provide a space 38 for the reception of a head of the bolt 51; thus, in this formation a smooth undersurface is provided for running on a smooth pulley as well as inclined sides for engaging a complemental grooved pulley.

From the above it will be apparent that the connecting link 28 in the slots 27 cannot twist about an axis lengthwise of the belt but will rather maintain alignment of the belt at its connection. Further, the hinge action connection of the parts is very rigid and does not depend on any flexibility of the metal.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A connecter for a belt of frustro pyramidal cross-section comprising a sheet metal clamp folded to provide plates for engaging opposite faces of the belt at each end, said fold being slotted and providing resilient spaced bearings each shaped to restrict its entrance mouth to a size less than the diameter of said bearings, a link in the slot, and a pin extending through said link and detachably engaging said bearings for pivotal connection of the link thereto, said pin having a continuous central larger portion providing shoulders at each end thereof, said shoulders engaging the edges of the slot in said fold to prevent axial movement thereof when in one position relative thereto.

2. A connecter for belt ends comprising a pair of clamps, means for flexibly connecting said clamps together, each clamp comprising a pair of plates disposed in parallel planes, converging sections at an obtuse angle to the inner surface of each of said plates for connecting them together, and a resilient bearing at the juncture of said converging sections restricted to a size less than the diameter of the connecting pin fitted in said bearing so that the same may be snapped in laterally of its axis, said pin having a continuous central larger portion providing a shoulder adapted to bear against said converging sections to prevent relative axial movement thereof when in one position relative thereto.

3. A connecter for a belt of frustro-pyramidal cross-section comprising a metal clamp folded to provide a plate for engaging opposite faces of the belt at each end, the belt having a recess on its narrower face to receive one of said plates, the plate in contact with the narrower side of the belt having an offset therein toward the other plate of the same clamp, a bolt for drawing said plates toward each other to grip the belt between them, the head of said bolt lying entirely within the offset of the plate with which it contacts, and means including a pivot pin for connecting the ends of the belt connecters.

4. A connecter for belt ends comprising a pair of clamps, means for flexibly connecting said clamps together including a pin, each clamp comprising a pair of plates disposed in parallel planes, converging sections at an obtuse angle to the inner surface of each of said plates for connecting them together, and a bearing at the juncture of said converging sections restricted to a size less than the diameter of said pin, said pin having a continuous central portion of larger diameter providing a shoulder bearing against the edges of said converging sections to prevent relative axial movement thereof when in one position relative thereto.

5. A connecter for belt ends comprising a pair of clamps, means for flexibly connecting said clamps together, each clamp comprising a pair of plates disposed in parallel planes, converging sections at an obtuse angle to the inner surface of each of said plates for connecting them together, and a resilient bearing at the juncture of said converging sections being slotted and providing bearings on either sides of the slot which are restricted to a size less than the diameter of the connecting pin to be received therein so that the same may be snapped in laterally of its axis.

6. A connecter for a belt of frustro-pyramidal cross-section comprising a clamp for each end of the belt having jaws engaging the top and bottom surfaces of the end portions of the belt and leaving the tapering surfaces free, each of said clamps having a slot and spaced resilient bearings with a constricted opening thereto, a connecting link in said slots provided with flat surfaces for engaging the opposite edges of the slot, said link being provided with spaced openings completely surrounded by stock, and pins in said link openings having a central larger portion providing shoulders, said shoulders engaging the edges of said slots to prevent axial movement thereof when in one position relative thereto, and said pins being of a size to snap through said constricted openings by reason of the resilience of said bearings to be detachably secured in said bearings.

WELLINGTON P. TABER.